Jan. 19, 1960 C. F. GELL 2,921,500
SELECTIVE PRESCRIPTION ABSORPTIVE EYE GLASSES
Filed March 24, 1958 2 Sheets-Sheet 1
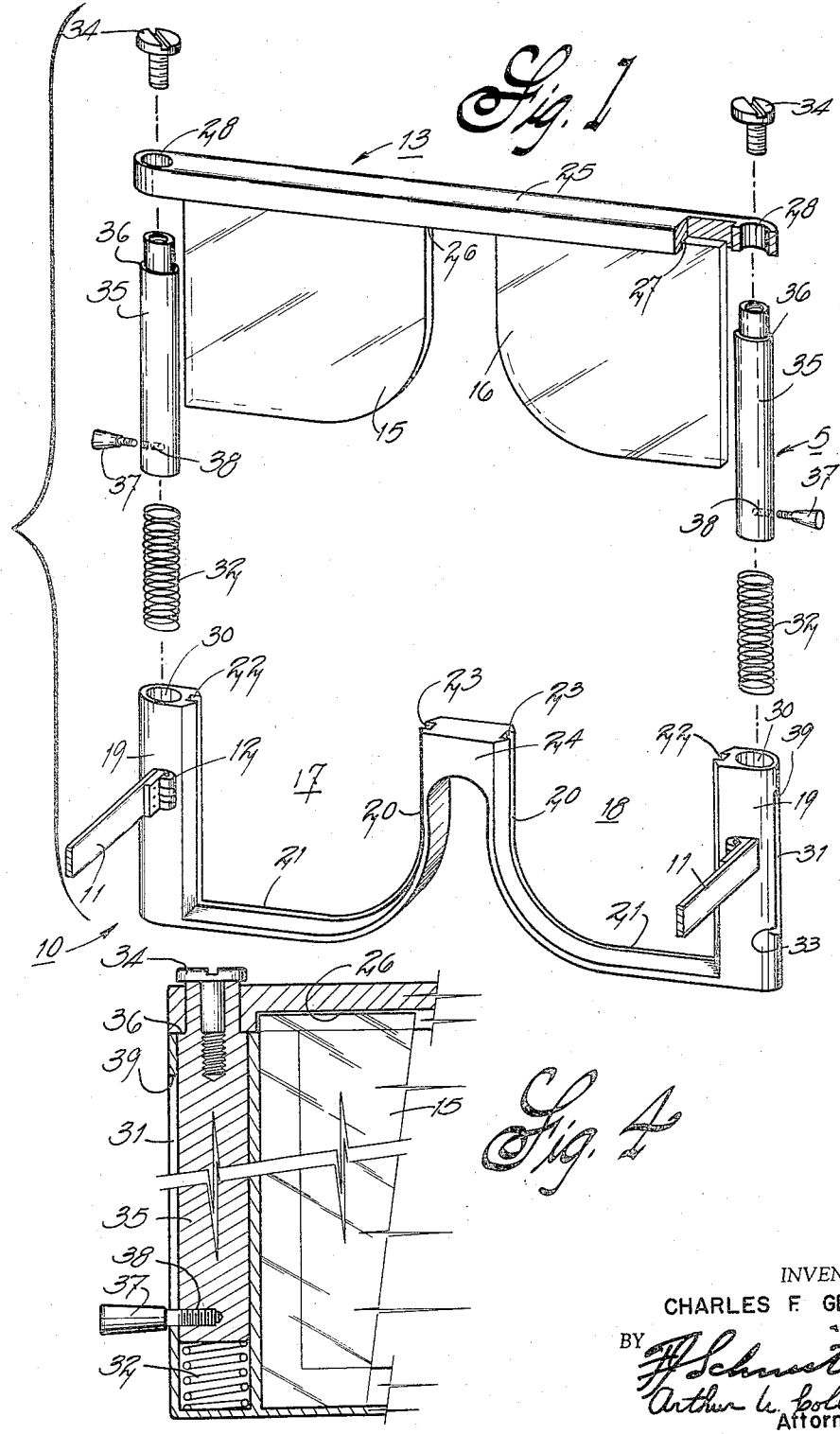
INVENTOR.
CHARLES F. GELL
BY
Attorneys

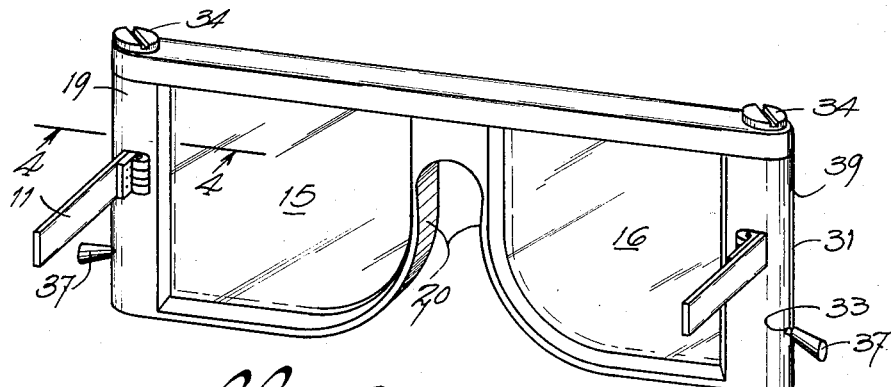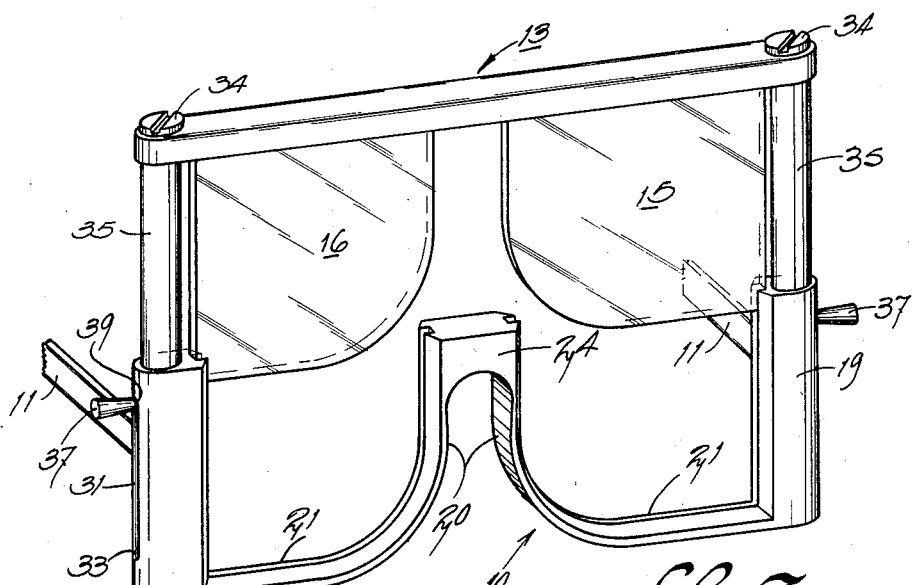

United States Patent Office 2,921,500
Patented Jan. 19, 1960

2,921,500

SELECTIVE PRESCRIPTION ABSORPTIVE EYE GLASSES

Charles F. Gell, Willow Grove, Pa., assignor to the United States of America as represented by the Secretary of the Navy Application March 24, 1958, Serial No. 723,613

2 Claims. (Cl. 88—41)

(Granted under Title 35, U.S. Code (1952), sec. 266)

The invention described herein may be manufactured and used by or for the Government of the United States of America for governmental purposes without the payment of any royalties thereon or therefor.

This invention relates to eye glasses and particularly to those in which the lenses are displaceable from the line of vision with respect to the frame.

Need for such a device is typically found in the aged aviator who is in a presbyopic state of sight which immediately places him in a difficult situation insofar as his vision and his flying are concerned. The difficulty arises from the fact that he needs a near vision corrective lens in order to read maps and fine markings on instruments or to adjust such instruments, as a radio. At the same time, it is necessary for him to remove his near vision lenses rapidly for making distant observations as when looking out of the plane to spot other aircraft or to watch the runway to make a landing. Presumably bifocal lenses would solve the problem; however, because of the diverse locations of the devices to which he must refer, it is practically impossible to utilize them in all cases. For instance, radio dials located on the ceiling can't be observed satisfactorily since the neck cannot be craned backwardly sufficiently.

It is, therefore, the purpose of this invention to provide a device in which the lenses are quickly moved from the line of vision with respect to the frame to an elevated position and which are radily returned to their original position within the frame.

It is a further object of this invention to provide such glasses in which the optical elements are displaced vertically upward under the force of a spring that is released by the fingers.

It is another object of this invention to provide such a device in which the lenses are disposed in the same vertical plane.

Other objects of many of the attendant advantages of this invention will be readily appreciated as the same becomes better understood by reference to the following detailed description when considered in connection with the accompanying drawings wherein:

Fig. 1 is an exploded perspective view of the invention with parts of some of the elements broken away.

Fig. 2 is a front elevational view of the invention showing the lens lowered into the frame.

Fig. 3 is similar to Fig. 2 but shows the lens in a position elevated in the frame.

Fig. 4 is a sectional view along the line 4—4 of Fig. 2.

Broadly, as shown in the drawing, the device comprises a main frame 10 having a temple 11 hinged, as at 12, to each side in the usual manner, a lens assembly 13 having a lens support member 25 carrying the lenses 15 and 16, and an elevating means 5 including a spring biased rod 35 operatively connected to the lens assembly and frame for vertically raising the lens with respect to the eyes.

The main frame 10 includes a pair of separated lens frames 17 and 18, somewhat U-like in shape, joined by a bridge member 24 which provides a means for mounting the main frame on the wearer's nose. Each lens frame, 17 and 18, has a vertical leg 19 disposed to the outer side of the wearer's eye, and extending from a point approximately below the eye to a point above it, an inner leg 20 extending for the same distance along the inner side of the eye, and a base leg 21 which joins the outer leg 19 to the inner leg 20 and extends across the wearer's face below the eye. The legs 19 and 20 are preferably grooved on their inner surfaces as at 22 and 23 for slidably receiving a lens from the open top of the U-like frame. When positioned in the lens frame, the lens rests on the base leg 21 between the legs 19 and 20. Obviously the upper surface of the base leg 21 may be grooved in the manner of the inner surfaces of legs 19 and 20, if so desired; to seat the lower edge of a lens. As illustrated, a single piece of material, as molded plastic, may be used to form the main frame.

The lens assembly 13 includes a brow or lens support member 25 of suitable material, as plastic, extending generally horizontally across the brow. Spaced grooves 26 and 27 are provided on its under surface just over the eyes in which the outer edges of the optical elements or lenses 15 and 16 are secured, as by an adhesive appropriate for the purpose. Obviously, only one lens may be used where desired.

The lens support member 25 extends beyond the outer edges of each lens sufficiently to cover the tops on the vertical legs 19 and 19 of the U-like lens-frames. Each portion or extension is provided with an aperture 28 extending vertically through it, the purpose of which will be described below.

To provide ready displacement of the lens from the lens frames, each of the outer legs 19 has a vertical bore 30 aligned with aperture 28 in the lens support member extending from its top to just short of its lower end, thus leaving the bore closed at the bottom. A compression spring 32 is seated in each bore. The wall of at least one vertical leg 19 to the outer side of the eye is penetrated with a longitudinal slot 31 beginning just below the top of the leg 19 and ending at a distance sufficient to provide room for the spring 32 in its compressed condition in the bore below the slot. The slot 31 is horizontally extended at its lower end forming a shoulder 33 in the leg 19 adapted for receiving a latching pin 37 in the manner of a "bayonet" type coupling.

A rod 35 is rotatably secured at one end in each of the apertures 28 of the brow or support member 25 by means of a large headed screw 34. The end of each rod extending into the aperture 28 is reduced in diameter so as to provide a shoulder 36 for resting the brow member 25 and preventing its sliding down the rod. Each rod 35 is disposed in a bore 30 on a spring 32 and secured for restricted longitudinal or vertical and rotational movement in a leg 19 by providing at least one of the rods 35 with a pin 37 threaded into the lower end of the rod, as at 38, and which extends through the slot 31. Preferably both rods, as shown in the drawing, and legs 19 have similar provisions and construction with respect to slots and latching pins.

In operation, the lens assembly is lowered by applying a downward force on the pin 37 until the pin is opposite the horizontal extension of the slot 31. The lens assembly is locked in the lowered position (Fig. 2) by rotating the pin until it abuts the shoulder 33. In this position the lenses are seated in the lens frames before the wearer's eyes. To move the lenses from the line of vision, the pin 37, or pins, as the case may be, is turned in the opposite direction until it clears the shoulder 33. The springs 32 then carry the lens assembly rapidly upward until the pin abuts the shoulder 39 at the upper end of the slot. The lenses are then in the raised position shown in Fig. 3.

From the foregoing, it is readily apparent that a spectacle device is provided in which the lenses may rapidly be displaced from the line of vision of the wearer as is often required by persons such as an aviator in flight.

Obviously many modifications and variations of the present invention are possible in the light of the above teachings. It is therefore to be understood that within the scope of the appended claims the invention may be practiced otherwise than as specifically described.

What is claimed is:

1. In a spectacle frame, a main frame adapted for mounting on the wearer's nose, said frame having a leg vertically disposed to the outside of the wearer's eye between it and the ear and extending from a point below to a point above the eye; a vertically movable lens assembly, including a brow member disposed on said main frame, and a lens depending from said member to be positioned before the wearer's eye; a vertically reciprocable rod in said leg having one end operatively connected to said brow member and adapted for moving said lens assembly between a lowered position where the lens is before the eye and a raised position where the lens is above the eye; spring means in said leg urging said rod vertically to said raised position; a side away from the face of said leg being penetrated with a longitudinal slot having a horizontal extension at its lower end; and means comprising a pin secured to the lower end of said rod and extending through said slot for manually returning said rod, and lens thereby, to said lowered position from said raised position and releasably securing same in said lowered position.

2. A spectacle frame, comprising a main frame including a pair of lens receiving frames joined by an intermediate bridge portion, each of said lens-frames extending outwardly from said bridge portion across the face and under the eye of the wearer, a vertical leg secured to said lens receiving frame extending upward to a point above the eye and disposed outwardly from the eye between it and the ear, said vertical leg being provided with a vertical bore open at its upper end and closed at the lower end, a compression spring disposed in said bore, a lens support member disposed on said frame extending across the wearer's brow, lenses depending from said support member adapted for accommodation in said lens-frames, a rod rotatably secured at one end to said support member disposed in said bore in said vertical leg on said spring, a side away from the face of said leg being penetrated with a longitudinal slot having a horizontal extension at its lower end, means on said rod extending through said slot for lowering said rod vertically downward compressing said spring and thereby positioning said lenses in said lens-frames and releasably latching said rod in its lowered position with entry of said means in said horizontal extension of said slot and with exit therefrom releasing said rod so that said spring rapidly raises said rod and said lenses thereby to a position above the eyes.

References Cited in the file of this patent

UNITED STATES PATENTS

| | | |
|---|---|---|
| 1,847,635 | Taylor | Mar. 1, 1932 |
| 1,986,688 | Thiele | Jan. 1, 1935 |
| 2,057,287 | Bailey | Oct. 13, 1936 |
| 2,687,671 | Mosher | Aug. 31, 1954 |
| 2,752,819 | Krukowski | July 3, 1956 |
| 2,842,029 | Roth | July 8, 1958 |